Figure 1:
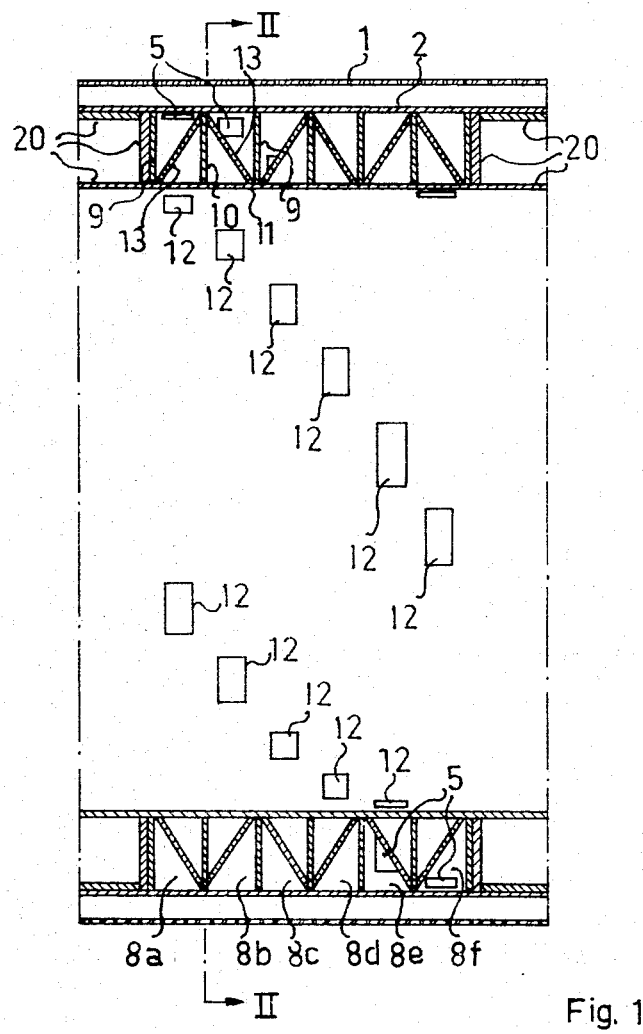

Sept. 27, 1966  L. E. K. A. TELL  3,275,155
ROTARY SUCTION FILTER DRUM

Filed Dec. 8, 1965  3 Sheets-Sheet 1

INVENTOR
LARS ERIK KARL AXEL TELL
BY
HIS ATTORNEYS

United States Patent Office 3,275,155
Patented Sept. 27, 1966

3,275,155
ROTARY SUCTION FILTER DRUM
Lars Erik Karl Axel Tell, Karlstad, Sweden, assignor to Aktiebolaget Karlstads Mekaniska Werkstad, Karlstad, Sweden, a Swedish company
Filed Dec. 8, 1965, Ser. No. 512,425
Claims priority, application Sweden, Dec. 14, 1964, 15,124/64
7 Claims. (Cl. 210—404)

The present invention relates to a rotary suction filter drum for the dewatering of suspensions, in particular fibre suspension as e.g. pulp, of the type comprising an outer, cylindrical, perforated strainer casing, an inner cylindrical casing, a plurality of axially extending walls in the space between said two casings dividing said space into a number of axially extending cells, said inner casing having at least one opening from each one of said cells, and a discharge duct extending from each one of said openings circumferentially along the inner surface of said inner casing opposite to the direction of rotation of said drum and opening into the interior of the drum. When operating, a filter drum of this type is rotating partially submerged in the suspension to be dewatered and a layer of the solid material in the suspension will be carried along by the outer, strainer casing of the drum out of the suspension and simultaneously be dewatered through the strainer casing, whereafter this layer is removed from the outer strainer casing in some suitable manner at a point of the drum above the liquid level of the suspension. The liquid drained from the filtrate layer on the outer strainer casing of the drum through this casing into the cells inside the outer casing is conducted from these cells through the above mentioned discharge ducts to the interior of the drum, wherefrom the liquid is discharged through one or both ends of the drum. The object of these discharge ducts is not only to serve as conduits for the liquid drained from the filtrate layer on the outer strainer casing of the drum, but they will also create a depression or vacuum within those cells covered by the filtrate layer and thus a suction force, which will forcibly assist in dewatering the filtrate layer on the strainer casing of the drum and to keep the filtrate layer onto the drum. This is achieved due to the fact that each discharge duct will, when it is in the lowermost portion of the drum, which is submerged in the suspension, be filled with water partially through its inlet opening at its associated cell from the suspension present outside the drum and partially through its rear outlet end in the interior of the drum from the liquid volume previously drained from the suspension and present in the lowermost portion of the interior of the drum. The internal liquid level in the drum may be dammed up somewhat. When the discharge duct moves on together with the rotating drum, there is consequently created a water column in the duct corresponding to the length of the duct and this water column will create a depression in the cell communicating with the forward end of the duct corresponding to the head of the liquid column above the liquid level in the interior of the drum.

It is essential for an effective dewatering with such a filter drum that a liquid particle drained from the filtrate layer on the outer strainer casing of the drum through this casing to a cell inside the casing will have time to move to the opening in the inner casing of the drum communicating with said cell and thus to a discharge duct during the time a suction force is prevailing in said cell and said discharge duct. This time will be comparatively short, if the velocity of rotation of the drum is high, wherefore the longest distance, which a liquid particle has to travel within a cell to reach an opening in the inner casing of the drum, should be as short as possible. For this reason the axial space in the drum occupied by the discharge ducts should be as small as possible so that the drum can be provided with several openings in the inner casing and thus with several discharge ducts for each cell or so that all openings in the inner casing of the drum for all cells can be located as close to the central part of the drum as possible, whereby the maximum distance of travel for a liquid particle within a cell to the opening for the cell in the inner casing of the drum will be as short as possible. In order to achieve this it is known, for instance from the Swedish patent specifications 139,026 and 162,005, to dispose several openings in the inner casing of the drum belonging to different cells and the discharge ducts associated with these openings in one and the same plane perpendicular to the axis of the drum, in which case these openings are evenly spaced about the circumference of the drum. In this case, however, each discharge duct will have a length corresponding only to the circumferential distance between two adjacent openings in the inner casing of the drum. In order to obtain as large a suction force as possible and thus an effective water drainage each discharge duct should, however, have a length corresponding to one half of the circumference of the drum, which can be obtained with the above described arrangement of the discharge ducts only if not more than two discharge ducts are disposed in one and the same plane perpendicular to the axis of the drum. One has previously tried to solve both the problems discussed above by arranging the discharge ducts so as to run helically along the inner surface of the inner casing of the drum, as described in the Swedish patent specification 181,052. Such a system of discharge ducts will, however, have a complicated design, wherefore the costs of manufacturing the drum will be high and the weight of the drum be comparatively large. Also other constructions have been suggested for the solution of the two problems discussed. All these constructions have, however, the disadvantage that the system of discharge ducts has a comparatively complicated design and is consequently expensive to manufacture. The form of the discharge ducts system is furthermore often such that the discharge ducts cannot constitute a supporting constructive element of the drum, wherefore the other elements of the drum must be given a heavier design.

Object of the present invention is therefore a rotary suction filter drum of the type described above but having an arrangement of discharge ducts permitting that a larger number of separate discharge ducts having a large active length are disposed in one and the same plane perpendicular to the axis of the drum and giving simultaneously a system of discharge ducts, which is simple and cheap to manufacture and can fulfill a supporting function in the filter drum.

The rotary suction filter drum according to the invention is characterized in that the discharge ducts are divided into several groups disposed axially side by side in the drum, each comprising an even number not smaller than four of separate discharge ducts disposed in one and the same plane perpendicular to the axis of the drum and having their associated openings in the inner casing of the drum evenly spaced about the circumference of said inner casing, and in that each discharge duct in each one of said groups of discharge ducts is extending from its associated opening in the inner casing of the drum circumferentially opposite to the direction of rotation of the drum past the first subsequent opening in the inner casing of the drum belonging to the same group of discharge ducts not to open into the interior of the drum until adjacent the next subsequent opening in the inner casing of the drum belonging to the same group of discharge ducts. Each discharge duct in such a group of discharge ducts will over its first portion from its associated opening in the inner casing of the drum to the first subsequent opening in the inner casing belonging to the same group of discharge ducts run close to the inner surface of said inner casing and will over its remaining portion up to its opening into the interior of the drum run somewhat radially spaced from the inner surface of the inner casing and have another discharge duct belonging to the same group of discharge ducts running between it and the inner surface of the inner casing of the drum.

If the discharge ducts in a rotary suction filter drum are arranged according to the invention, it is obviously possible to dispose four separate discharge ducts, each having a length corresponding to one half of the circumference of the drum, in one and the same plane perpendicular to the axis of the drum. If the length of each discharge duct is restricted to correspond to only one third of the circumference of the drum, six different discharge ducts can be disposed in one and the same plane perpendicular to the axis of the drum, if the discharge ducts are arranged according to the present invention.

In an embodiment of the invention, which is particularly advantageous from a constructive point of view, each group of discharge ducts is formed by a closed annular pipe running along the inner surface of the inner casing of the drum right inside the openings in said inner casing associated with said group and having a rectangular cross section and one opening through its inner cylindrical wall into the interior of the drum for each discharge duct in the group, said openings into the interior of the drum being located adjacent the openings in the inner casing of the drum associated with said group of discharge ducts. Said annular pipe comprises furthermore a number of partition walls corresponding to the number of discharge ducts in the group, each one of said partition walls extending in the circumferential direction of the pipe from one pair of adjacent openings in the inner casing of the drum and into the interior of the drum respectively to a subsequent pair of such adjacent openings and dividing the rectangular cross sectional area of the pipe diagonally in an outer triangular section close to the inner casing of the drum and an inner triangular section close to the interior of the drum. At each pair of such adjacent openings the pipe is furthermore provided with a first transverse wall closing the inner triangular section of the pipe immediately before the opening into the interior of the drum, as seen in the direction of rotation of the drum, and a second transverse wall closing the outer triangular section of the pipe immediately after the opening in the inner casing of the drum, as seen in the direction of rotation of the drum, said two transverse walls being circumferentially spaced from each other and said outer triangular section and said inner triangular section of the pipe communicating with each other through the space between said two transverse walls.

In the following the invention will be further described with reference to the accompanying drawings, in which a preferred embodiment of a filter drum according to the invention is shown by way of example.

Figure 2:
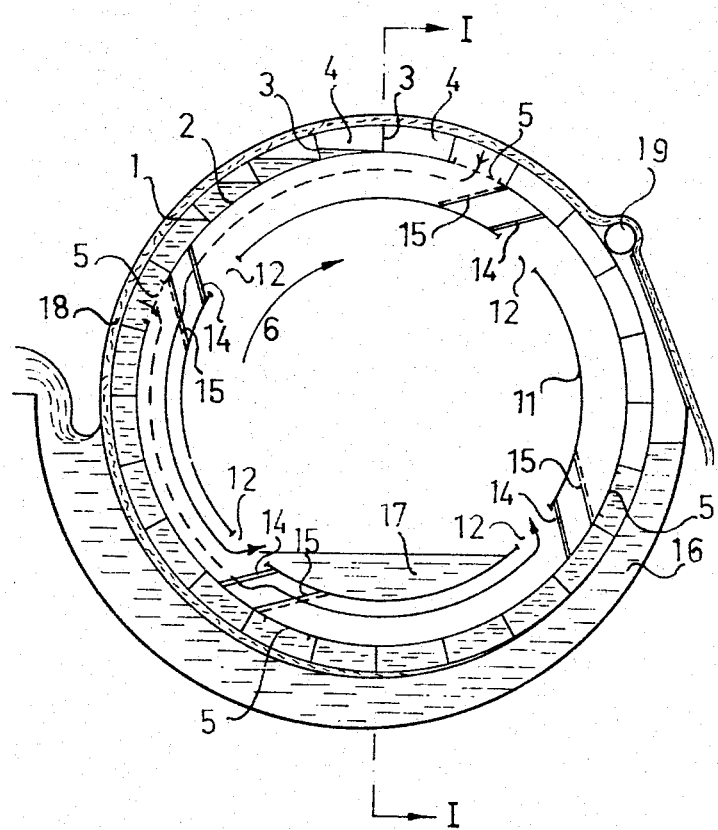
Figure 3:
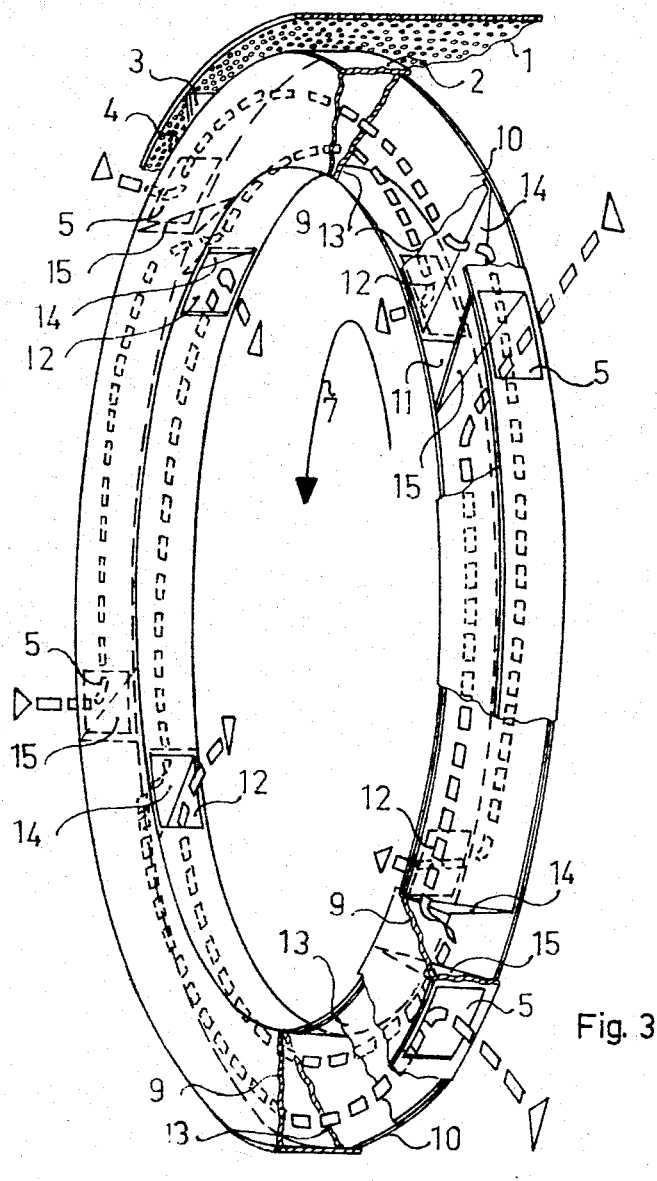

FIG. 1 is an axial section along the lines I—I in FIG. 2 through the portion of a filter drum according to the invention comprising the discharge ducts, FIG. 2 is a radial section through the filter drum along the line II—II in FIG. 1 and shows the filter drum in its operating position partially submerged in a suspension, and FIG. 3 is a perspective and partially cut-away illustration of the detailed design in the filter drum shown in FIGS. 1 and 2 of a group of several separate discharge ducts disposed in one and the same plane perpendicular to the axis of the drum.

With reference to the drawings the rotary suction filter drum according to the invention illustrated therein comprises in conventional manner an outer cylindrical perforated casing 1, the outer surface of which is normally provided with a fine sieve cloth not shown in the drawing, and an inner cylindrical casing 2 somewhat spaced from the outer perforated casing 1. Between the inner casing 2 and the outer casing 1 a number of axially extending walls 3 are arranged to divide the space between the inner and the outer casings into a number of axially extending cells 4. In the illustrated embodiment the number of cells is 24. The inner casing 2 is provided with an opening 5 for each one of said cells 4. Each opening 5 is communicating with a discharge duct, which runs circumferentially along the inner surface of the inner casing 2 in a direction opposite to the direction of rotation of the drum, indicated by an arrow 6 in FIG. 2 and by an arrow 7 in FIG. 3, from the associated opening 5 and opens into the interior of the drum. As the illustrated filter drum has 24 cells and there consequently are 24 openings in the inner casing 2 of the drum, the number of discharge ducts must also be 24. According to the present invention these discharge ducts are divided into a number of groups, each comprising several discharge ducts disposed in one and the same plane perpendicular to the axis of the drum. In the illustrated embodiment of the invention each such group comprises four discharge ducts, wherefore the drum is provided with six identical groups 8a, b, c, d, e and f of discharge ducts disposed axially side by side inside the inner casing 2 of the drum, as shown in FIG. 1.

Each one of said groups of discharge ducts, one of which is shown in detail in FIG. 3, consists of a closed annular pipe or conduit and disposed inside the inner casing 2 of the drum in a plane perpendicular to the axis of the drum. This pipe has a rectangular cross section and is formed by two annular radial side walls 9 and 10 and a cylindrical inner wall 11. The outer cylindrical wall of the pipe is formed by the inner casing 2 of the drum. The portion of the inner casing 2 of the drum, inside which the annular pipe forming a group of four discharge ducts is arranged, is provided with four openings 5, one for each discharge duct in the group, evenly spaced around the circumference of the drum. The inner cylindrical wall 11 of the pipe is in the same way provided with four openings 12 evenly spaced about the circumference and each one forming an outlet opening for one of the four discharge ducts in the group. The outlet openings 12 are located adjacent each one of the four inlet openings 5 in the inner casing 2 of the drum, the outlet openings 12 being, however, somewhat offset in the direction of rotation of the drum relative to the inlet openings 5.

Within the annular pipe formed by the side walls 9 and 10, the inner cylindrical wall 11 and the inner casing 2 of the drum there is a partition wall 13, which is extending in the longitudinal direction of the annular pipe and is dividing the rectangular cross section of the pipe diagonally into two triangular sections. The partition wall 13 is extending along the pipe over substantially the entire length of the pipe but is provided with short interruptions adjacent each pair of an inlet opening 5 and an outlet opening 12. The inner diagonal partition wall 13 is consequently divided in four portions and where these four portions of the partition wall are provided the pipe includes consequently two parallel ducts, viz. an outer duct having a triangular cross section disposed close to the inner casing 2 of the drum and an inner duct also having a triangular cross section but disposed close to the inner cylindrical wall 11. At each pair of an outlet opening 12 and an inlet opening 5 the annular pipe comprises furthermore a transverse wall 14, which closes the inner triangular section of the pipe and which is located immediately before the outlet opening 12 as seen in the direction of rotation of the drum, and a similar transverse wall 15, which closes the outer triangular section of the pipe and which is located immediately after the adjacent inlet opening 5. As the inlet opening 5 and the outlet opening 12 are somewhat offset in the circumferential direction relative to each other, the transverse walls 14 and 15 will be somewhat spaced from each other in the circumferential direction, and in this space between the transverse walls 14 and 15 the partition wall 13 is missing so that the outer triangular section and the inner triangular section of the pipe are communicating with each other through this space. As already mentioned corresponding transverse walls 14 and 15 are arranged at each pair of an inlet opening 5 and an outlet opening 12.

As can be seen in FIG. 3, each discharge duct will extend from the associated inlet opening 5 in the inner casing 2 of the drum circumferentially opposite to the direction of rotation of the drum along the inner surface of the inner casing 2 as the outer duct radially outside the partition wall 13 in the annular pipe as far as to the subsequent inlet opening 5, where it is connected through the space between the transverse walls 14 and 15 to the inner duct radially inside the partition wall 13 in the annular pipe, whereafter the discharge duct will continue in this inner duct on towards its outlet opening 12 adjacent the next subsequent inlet opening 5. In the illustrated embodiment of the invention each discharge duct has consequently a length corresponding to almost one half of the circumference of the drum and in spite of this four discharge ducts can be disposed in one and the same plane perpendicular to the axis of the drum.

As can be most readily seen in FIGS. 2 and 3, the transverse walls 14 and 15 are somewhat inclined forwardly in the direction of rotation of the drum relative to a radius in the drum, whereby an outlet opening 12 can be located very close to the adjacent inlet opening 5 at the same time as a sufficient flow area is provided for a discharge duct between the transverse walls 14 and 15. In this way each discharge duct will get a length, which is very close to one half of the circumference of the drum.

In FIG. 3 the flow path in all four discharge ducts of the group are indicated by dotted arrows. It should be noted, however, that in the practice a liquid flow is of course not existing at one and the same time in all these four discharge ducts, but that the discharge ducts are operating in the conventional manner for a rotary suction filter drum of this type, as schematically illustrated in FIG. 2. When the forward inlet end of a discharge duct with the associated cell between the outer perforated casing 1 and the inner casing 2 of the drum is moved by the rotation of the drum in the direction of the arrow 6 in FIG. 2 below the surface level of the suspension 16 surrounding the lower portion of the drum, liquid forced into the cell through the perforated outer strainer casing 1 by the liquid pressure in the suspension 16 will start to fill the cell and the discharge duct. At this stage the rear outlet end of the discharge duct is located above the liquid level of the liquid volume 17 present in the interior of the drum. This liquid volume has a free exit from the drum through one or both of the ends of the drum. Due to the flow of liquid into the cell and the discharge duct under the influence of the liquid pressure in the suspension 16 the particles of solid material, for instance fibres, in the suspension are pressed against the outer strainer casing 1 of the drum. As the forward end of the discharge duct and the associated cell are moving through the suspension 16, the discharge duct will be more and more filled with liquid and an increasingly thicker layer 18 of filtrate will assemble onto the outer strainer casing 1 of the drum. When the forward end of the discharge duct together with the associated cell emerges from the surface of the suspension 16, there is consequently a liquid column in the discharge duct having a certain head above the liquid level of the liquid 17 present in the interior of the drum and this liquid column will try to flow out of the discharge duct through the rear outlet end of the duct, which opens into the interior of the drum and at this stage is located in the lower portion of the drum possibly below the liquid level for the liquid 17. Due to this a corresponding depression or vacuum is created in the forward part of the discharge duct and in the cell 4 connected to the discharge duct, whereby liquid is drained by a suction force from the filtrate layer 18 on the outer surface of the outer strainer casing 1 of the drum. The liquid drained from the filtrate layer will flow into the discharge duct and replenish the liquid column therein, whereby the liquid column in the discharge duct is maintained. The dewatering of the filtrate layer 18 will consequently continue, until the filtrate layer 18 is removed from the outer casing 1 of the drum by a roller 19 or in any other suitable conventional manner. When the filtrate layer is removed from the outer casing of the drum the ambient air pressure is freely admitted to the upper end of the discharge duct, whereby the liquid column present in the duct will flow out through the outlet end of the duct into the interior of the drum.

Although the embodiment of the invention shown in the drawing and described above has proven to be very satisfactory, there are of course several other possible embodiments within the scope of the invention. As already mentioned, the number of separate discharge ducts in each group of the discharge ducts disposed in one and the same plane perpendicular to the axis of the drum can of course be increased, if the length of each individual discharge duct is reduced. Thus, for instance, six discharge ducts can obviously be disposed in one and the same plane perpendicular to the axis of the drum, if the length of each individual discharge duct is reduced to correspond to only one third of the circumference of the drum. In this case the suction force is of course reduced to a corresponding degree.

Furthermore, it is not necessary that the closed annular pipe forming a group of discharge ducts has a rectangular cross section, as shown in the described embodiment of the invention, even if this is preferable with respect to the construction and the manufacture of the drum. In an annular pipe having a rectangular cross section, as in the illustrated embodiment of the invention, it is further not necessary that the internal partition wall 13 is arranged to divide the rectangular cross section of the pipe diagonally, as in the illustrated embodiment, but this partition wall can of course also be arranged in some other way, for instance be cylindrical and divide the rectangular cross section of the annular pipe in two smaller rectangular sections, one disposed close to the inner casing 2 of the drum and the other disposed close to the inner cylindrical wall 11 of the pipe. The diagonal internal partition wall in the illustrated embodiment of the invention has, however, advantages with respect to the manufacturing of the discharge duct.

As can be seen in FIG. 1, the internal partition walls 13 in the annular pipes forming the different groups of discharge ducts are preferably so arranged that they are inclined relative to each other in two adjacent groups of discharge ducts. In this way the system of discharge ducts can be assembled by a number of identical annular units, each consisting of an annular radial wall 10 and two diagonal partition walls 13 inclined relative to each other on opposite sides of the radial wall 10 and an inner cylindrical wall 11 attached to the radial walls 10 and the diagonal partition walls 13 and having a breadth corresponding to the axial breadth of two groups of discharge ducts. Units of this type can be inserted loosely into the inner cylindrical casing 2 of the drum separated by loose annular radial walls 9, in which case the different units and annular radial walls 9 are kept together and in a correct position in the drum by means of cylindrical end sections and intermediate sections 20 of suitable axial length and the same radial dimension as the groups 8a, b, c, d, e and f of discharge ducts and by end plates bolted to the ends of the drum. The discharge ducts according to the invention will obviously form a supporting component of the drum.

I claim:

1. A rotary suction filter drum comprising an outer cylindrical, perforated casing, an inner cylindrical casing spaced from said outer casing, a plurality of axially extending walls in the space between said outer and inner casings dividing said space into a plurality of axially extending cells, at least one opening in said inner casing from each one of said cells, and a discharge duct extending from each one of said openings circumferentially along the inner surface of said inner casing rearwardly with respect to the direction of rotation of the drum, said discharge ducts being divided into several groups axially disposed side by side in the drum, each one of said groups comprising an even number not smaller than four of discharge ducts disposed in one and the same plane perpendicular to the axis of the drum and having their associated openings in said inner casing evenly spaced around the circumference of said inner casing, each discharge duct in each one of said groups extending from its associated opening in said inner casing opposite to the direction of rotation of the drum past the first subsequent opening in said inner casing associated with the same group of discharge ducts not to open into the interior of the drum until adjacent the next subsequent opening in said inner casing associated with the same group of discharge ducts, whereby each discharge duct is over its first portion from its associated opening in said inner casing to the first subsequent opening in said inner casing running immediately close to the inner surface of said inner casing and over its remaining portion to its opening into the interior of the drum running somewhat radially spaced from said inner casing and having another discharge duct belonging to the same group of discharge ducts running between it and the inner surface of said inner casing.

2. A rotary suction filter drum as claimed in claim 1, wherein each one of said groups of discharge ducts is formed by a closed, annular pipe running circumferentially along the inner surface of said inner casing right inside said openings in said inner casing belonging to said group of discharge ducts and having openings towards the interior of the drum disposed adjacent said openings in said inner casing, said pipe including a number of partition walls corresponding to the number of discharge ducts in said group, each one of said partition walls extending in the circumferential direction of said pipe from one pair of said adjacent openings in said inner casing and towards the interior of the drum respectively to a subsequent pair of said adjacent openings and dividing the cross sectional area of said pipe into an outer section close to said inner casing and an inner section close to the interior of the drum, and at each pair of adjacent openings a first transverse wall closing said inner section of said pipe immediately before the opening into the interior of the drum, as seen in the direction of rotation of the drum, and a second transverse wall closing said outer section of said pipe immediately after the opening in said inner casing, as seen in the direction of rotation of the drum, said first and second transverse walls being circumferentially spaced from each other and said inner section and said outer section of said pipe communicating with each other through the space between said first and second transverse walls.

3. A rotary suction filter drum as claimed in claim 2, wherein said transverse walls in said annular pipe are inclined forwardly in the direction of rotation of the drum with respect to a radius in the drum.

4. A rotary suction filter drum as claimed in claim 2, wherein said annular pipe has a rectangular cross section.

5. A rotary suction filter drum as claimed in claim 4, wherein said partition walls are dividing said rectangular cross section of said pipe along a diagonal into two triangular sections.

6. A rotary suction filter drum as claimed in claim 4, wherein two of said annular pipes being disposed axially side by side and forming separate groups of discharge ducts have a common radial wall.

7. A rotary suction filter drum as claimed in claim 5, wherein said partition walls are inclined relative to each other in pipes being disposed axially side by side and forming separate groups of discharge ducts.

No references cited.

REUBEN FRIEDMAN, *Primary Examiner.*

SAMIH ZAHARNA, *Examiner.*